Aug. 20, 1957     J. B. JONES     2,803,735
ULTRASONIC SOLDERING IRON

Filed Oct. 6, 1955     3 Sheets-Sheet 1

INVENTOR.
JAMES B. JONES
BY *Arthur H. Seidel*
ATTORNEY

Aug. 20, 1957  J. B. JONES  2,803,735
ULTRASONIC SOLDERING IRON
Filed Oct. 6, 1955  3 Sheets-Sheet 3

INVENTOR.
JAMES B. JONES
BY Arthur H. Seidel
ATTORNEY

United States Patent Office 2,803,735
Patented Aug. 20, 1957

2,803,735

ULTRASONIC SOLDERING IRON

James Byron Jones, West Chester, Pa., assignor to Aeroprojects, Inc., West Chester, Pa., a corporation of Pennsylvania Application October 6, 1955, Serial No. 538,833

8 Claims. (Cl. 219—26)

The present invention relates to soldering apparatus, and more particularly to an ultrasonic soldering iron.

This invention has as an object the provision of an ultrasonic soldering iron, which is easy to operate, and which may be used in locations where a relatively large amount of manipulation is required or desirable.

This invention has as a further object the provision of an ultrasonic soldering iron having a long useful operating life.

This invention has as another object the provision of an ultrasonic soldering iron in which over-heating of the transducer elements is avoided.

A still further object of the present invention is the provision of an ultrasonic soldering unit of compact and efficient design.

Other objects will appear hereinafter.

For the purpose of illustrating the invention there is shown in the drawings forms which are presently preferred; it being understood, however, that this invention is not limited to the precise arrangements and instrumentalities shown.

Figure 1:
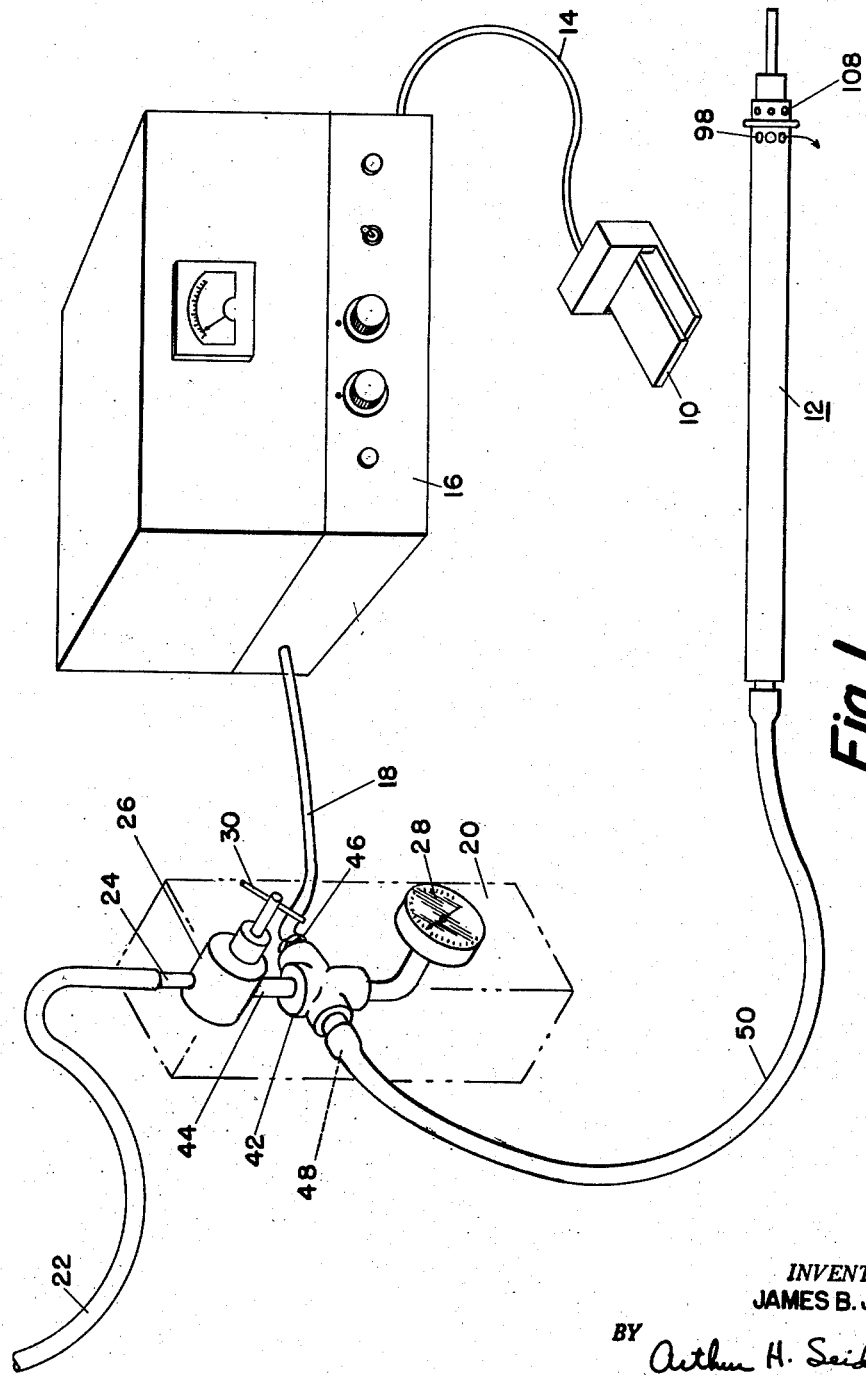
Figure 1 is a perspective view of an ultrasonic soldering unit, including the ultrasonic soldering iron of the present invention.

Referring to the drawings, and initially to Figure 1, the numeral 10 designates the foot switch by which the operator of the ultrasonic soldering unit of the present invention controls the flow of energizing current to the soldering iron designated 12.

Foot switch 10 is connected by line 14 to a generator 16 which may be of any suitable design known to those skilled in the art; said generators normally including a power supply, an oscillator for generating the frequency, an amplifier for raising the generated frequency to the requisite power level, and a direct current polarization source for biasing the magnetostrictive transducer in the ultrasonic soldering iron 12.

Generator 16 is connected by line 18 to a gas-pressure or air-pressure control box 20. A conduit 22, such as a flexible conduit of synthetic rubber or the like, joins an air pressure source to fitting 24 of air-pressure regulator 26, within air-pressure control box 20. Air-pressure regulator 26 is in communication with air-pressure gauge 28, and the flow of gas through air-pressure regulator 26 can be controlled manually by handle 30, which extends outwardly from air-pressure regulator 26 through the wall of air-pressure control box 20.

The electrical wires from line 18 include the four lead wires 32, 34, 36 and 38, and the return wire 39 (see Figure 2a), all of which are held together by fabric sheath 40, which may be of elastomeric material, such as synthetic rubber or the like.

Sheath 40 extends through a pipe cross 42. Conduit 44 through which air passes between air-pressure regulator 26 and air-pressure gauge 28, extends into and out of pipe cross 42, but is perforated within pipe cross 42 permitting the escape of air therewithin. Pipe cross 42 is provided with an O-ring nut 46 carrying an O-ring. O-ring nut 46 tightly embraces sheath 40, effecting an air-tight fit between sheath 40 and pipe cross 42. Conduit 44 is air-tightly secured in respect to pipe cross 42 at both its entrance and its exit.

Pipe cross 42 is provided with a fitting member 48 having a flared terminus, over which a flexible conduit 50 of elastomeric material, such as synthetic rubber or the like, is slip-fitted. The wall thickness of conduit 50 is such that there is no appreciable expansion thereof under the air-pressures released through air-pressure regulator 26.

Figure 2:
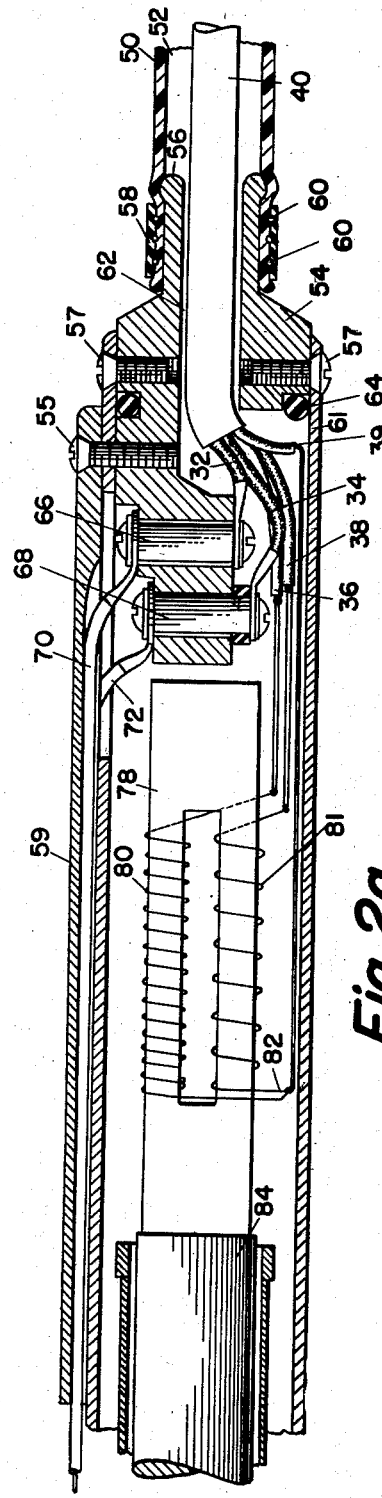
Figure 2a is a fragmentary longitudinal section through a portion of one embodiment of the ultrasonic soldering iron of the present invention.
Figure 2b is a complementary longitudinal sectional view to that of Figure 2a of a substantial portion of the remainder of the ultrasonic soldering iron of the present invention.

Sheath 40 passes through conduit 50, the clearance between sheath 40 and the inner wall surface of conduit 50 being sufficient to provide a passageway designated 52 in Figure 2a for the air released from pipe cross 42.

The soldering iron 12 is provided with a terminal fitting 54 over which conduit 50 is slipped. Fitting 54 is provided with a beaded terminal edge 56 which aids in the retention of conduit 50 thereon. In addition, a tightly wound plastic tape, or like holding means 58, and wire loops 60 serve to retain conduit 50 operatively positioned over fitting 54 notwithstanding the movement of soldering iron 12 during operative manipulation thereof.

Fitting 54 is provided with a channel 62 through which sheath 40 is inserted. Thus, the inner diameter of fitting 54 is somewhat larger than the outer diameter of sheath 40, so that a clearance constituting the channel 62 is provided between the outer surface of sheath 40 and the inner wall of fitting 54.

Fitting 54 may be retained in operative position in respect to soldering iron 12 by threaded screws 55 and 57. Thus, screw 55 is inserted inwardly through outer flat retention plate 59 and inner tubular housing 61 into fitting 54. Screws 57 are inserted inwardly through tubular housing 61 into fitting 54.

An O-ring 64 is retained on fitting 54 and provides a tight seal between fitting 54 and tubular housing 61.

Wires 32, 34, 36 and 38 extend from sheath 40, with wires 32 and 34 being secured to respective posts 66 and 68, which are carried on fitting 54. Posts 66 and 68 are connected by respective wires 70 and 72 to tip heater 74 which embraces the inner end of soldering tip 76. Wires 36 and 38 comprise respectively the polarizing coil 80 and the excitation coil 81 for nickel stack 78, the two wires coming together at wire 82 to form wire 39, which exits from the soldering iron 12 through sheath 40.

The nickel stack 78 may comprise a magnetostrictive transducer constituting a laminated core of nickel or like elements useful as a magnetostrictive transducer. The detailed construction of a suitable nickel stack is well known to those skilled in this art, and does not form part of the present invention, and accordingly no detailed description of its construction will be made herein.

The nickel stack 78 is fixedly secured as by silver brazing, or the like, to coupling bar 84. Coupling bar 84 is retained within sleeve 86, and is fixedly secured thereto at its forwardmost end. Sleeve 86 is anchored at its axial midpoint by a radially-extending flange 87 which is seated between bushings 94 and 95. A clearance 88 is maintained between the outer surface of sleeve 86 and the inner surface of tubular housing 61 in order to provide a passageway for air introduced through channel 62.

Soldering tip 76 is joined to coupling bar 84 by threaded bolt 89, which is received in matingly threaded female openings in coupling bar 84 and in soldering tip 76.

A tubular extension 90 is telescopically received within tubular housing 61 and is retained in fixedly secured relation thereto by means of threaded screws 92, and by screw 93 which joins plate 59, housing 61 and extension 90 together. A mating pair of telescopic retention bushings 94 and 95 are retained in position against the inner face of housing 61 by threaded screws 96. Bushings 94 and 95 serve the dual purpose of providing an air-tight seal between the innermost end of extension 90 and the terminal portion of tubular housing 61, and anchoring sleeve 86.

Extension 90 is provided with discharge outlets 98 comprising perforations in its wall proximate the innermost end of tip heater 74. A flange head 100 and an annular flange 102 are provided at the terminal portion of soldering iron 12 and serve to retain tip heater 74 in position. Shims 104 and 106, which are received in tip heater 74, are also seated against respective shoulders on flange head 100 and serve to provide an air-tight seal for the front end of extension 90 proximate the rear end of tip heater 74. If desired, shims 104 and 106 may be removed, permitting the discharge of air from passageway 88, not only through discharge outlets 98 but also through discharge outlets 108 which are provided in flange head 100.

The operation of the soldering iron 12 of the present invention is as follows:

Control of operation of soldering iron 12 is effected through foot switch 10, the depression of foot switch 10 causing energizing current to be passed through generator 16 and into soldering iron 12.

In use, soldering is effected due to the rapid vibration of soldering tip 76, responsive to the vibration of coupling bar 84, which in turn is responsive to the vibration of nickel stack 78. Air is continuously transferred through conduit 22, air pressure regulator 26 and conduit 50 through channel 62 and channel 88. This stream of air prevents the stack 78 and coupling bar 84 from becoming overheated, such air stream acting as a heat-exchange medium, withdrawing heat from stack 78 and coupling bar 84, during its passage through the aforesaid channel 88. The air is discharged from soldering iron 12 to the atmosphere through discharge outlets 98. In this manner, the soldering iron 12 may be used for extended periods of time without overheating stack 78, notwithstanding the simultaneous use of tip heater 74.

Moreover, the soldering iron 12 may be freely manipulated, being unencumbered by a plurality of lines passing thereto.

Figure 3:
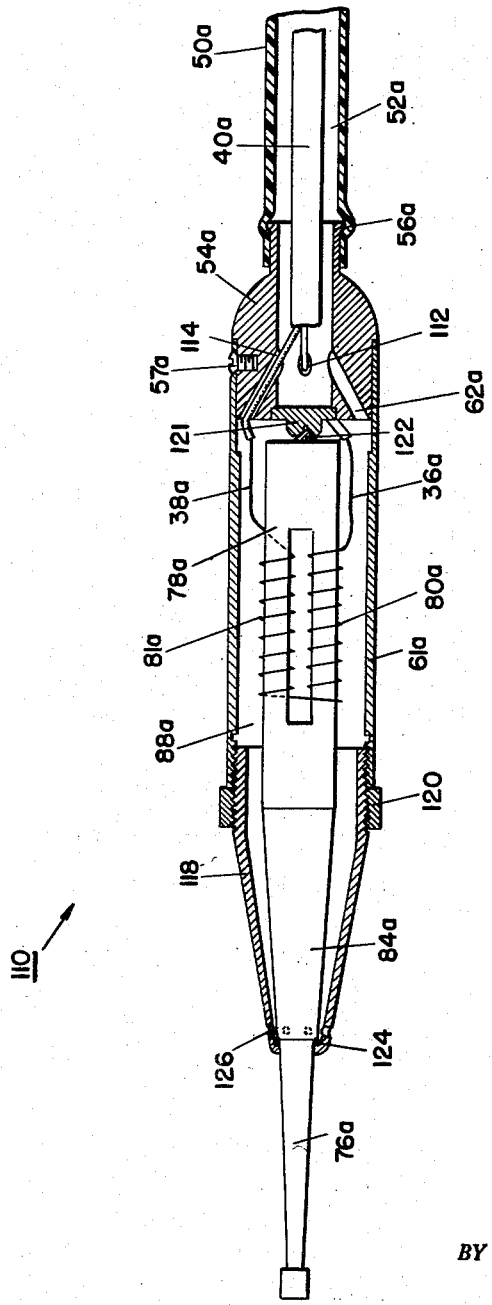
Figure 3 is a longitudinal sectional view of another embodiment of the ultrasonic soldering iron of the present invention.

In the embodiment of the ultrasonic soldering iron designated 110 shown in Figure 3 the conduit 50a containing a wire-encompassing sheath 40a is slip-fitted over the beaded terminal edge 56a of terminal fitting 54a. A passageway designated 52a is provided between the inner wall surface of conduit 50a and sheath 40a.

Conduit 50a may be secured to a pipe cross within an air-pressure control box similar to that shown in Figure 1. Moreover, the wires within sheath 40a may be in electrical contact with a suitable generator generally similar to that shown in Figure 1.

Wires 36a and 38a extend through channels 112 and 114, respectively, in terminal fitting 54a. Terminal fitting 54a is also provided with channels 62a for permitting the passage of air into the interior 88a of ultrasonic soldering iron 110.

Wires 36a and 38a comprise the excitation coil 80a and polarizing coil 81a of magnetostrictive transducer 78a.

The magnetostrictive transducer 78a is fixedly secured, as by silver brazing, or the like, to coupling bar 84a. Coupling bar 84a is fixedly secured to soldering tip 76a.

The outer shell of ultrasonic soldering iron 110a includes a tubular housing 61a which is air-tightly fitted over the forwardmost end of terminal fitting 54a, and secured thereto by screws 57a.

The forwardmost end of the shell of ultrasonic soldering iron 110 comprises nose element 118, which is threadably secured to the forwardmost portion of housing 61a. A collar 120 may be threadably carried on the outer surface of nose element 118 adjacent the forwardmost end of housing 61a.

The magnetostrictive transducer 78a and coupling bar 84a are wedged within the interior 88a of ultrasonic soldering iron 110 by a pillow block 121 which is carried within terminal fitting 54a and a mating wedge 122 which is engaged with magnetostrictive transducer 78a. A gasket or O-ring 124 may be furnished in the front end of nose element 118 against which the shoulder formed by the front end of coupling bar 84a may be seated.

Air discharge openings 126 are provided in the forwardmost end of nose element 118.

When ultrasonic soldering iron 110 is in use, air is flowed through passageway 52a, channels 62a, interior 88a and discharge openings 126. The flowing air serves as a heat-exchange medium and serves to withdraw heat from stack 78a and coupling bar 84a when the ultrasonic soldering iron 110 is in use.

The present invention may be embodied in other specific forms without departing from the spirit or essential attributes thereof, and accordingly, reference should be made to the appended claims, rather than to the foregoing specification as indicating the scope of the invention.

I claim:

1. Ultrasonic soldering apparatus including a soldering iron comprising a longitudinal and generally imperforate housing, a magnetostrictive transducer within said housing, a soldering tip coupled to said magnetostrictive transducer, said magnetostrictive transducer being spaced from the inner wall surface of said housing a sufficient distance to form a passageway between said transducer and the inner wall surface of said housing, an inlet to said housing spaced from the end of said magnetostrictive transducer remote from said soldering tip, said inlet being in communication with said passageway, a discharge orifice in the wall of said housing in communication with said passageway and spaced from the end of said magnetostrictive transducer remote from said inlet, a flexible tubular conduit gas-tightly joined to said inlet, sheathed electrical conductors extending through said conduit and inlet into said housing to said magnetostrictive transducer, said flexible conduit having an internal cross-section sufficiently greater than the cross-section of said sheathed electrical conductors to permit the passage of gas therethrough into the passageway within the housing of said soldering iron.

2. Ultrasonic soldering apparatus including a soldering iron comprising a longitudinal and generally imperforate housing, a magnetostrictive transducer within said housing, a soldering tip coupled to said magnetostrictive transducer, said magnetostrictive transducer being spaced from the inner wall surface of said housing, a discharge orifice in the wall of said housing intermediate the ends of said housing, an inlet to said housing spaced from the end of said magnetostrictive transducer remote from said soldering tip, a flexible tubular conduit joined to said inlet, sheathed electrical conductors extending through said conduit and inlet into said housing to said magnetostrictive transducer, said flexible conduit having an internal cross-section sufficiently greater than the cross-section of said sheathed electrical conductors to permit the passage of gas therethrough, and a passageway extending from said inlet to said discharge orifice in the wall of said housing.

3. Ultrasonic apparatus including a soldering iron comprising a longitudinal and generally imperforate housing, a magnetostrictive transducer within said housing, a soldering tip coupled to one end of said magnetostrictive transducer by a coupling bar, a passageway intermediate the outer surface of said transducer and coupling bar and the inner wall surface of said housing, an inlet to said housing spaced from the end of said transducer remote from said soldering tip, said inlet being in communication with said passageway, a discharge orifice in the wall of said housing proximate the portion of said soldering tip joined to said coupling bar, a flexible tubular conduit gas-tightly joined to said inlet, sheathed electrical conductors extending through said conduit and inlet into said housing to said magnetostrictive transducer, said flexible conduit having an internal cross-section sufficiently greater than the cross-section of said sheathed electrical conductors to permit the passage of gas therethrough into the passageway within the housing of said soldering iron.

4. Ultrasonic apparatus including a soldering iron comprising a longitudinal and generally imperforate housing, a magnetostrictive transducer within said housing, a soldering tip coupled to one end of said magnetostrictive transducer by a coupling bar, a passageway intermediate the outer surface of said transducer and coupling bar and the inner wall surface of said housing, an inlet to said housing spaced from the end of said transducer remote from said soldering tip, a soldering tip heater embracing said soldering tip, said inlet being in communication with said passageway, a discharge orifice in the wall of said housing proximate the portion of said soldering tip joined to said inlet, sheathed electrical conductors extending through a flexible conduit and said inlet into said housing to said magnetostrictive transducer and said soldering tip heater, said flexible conduit having an internal cross-section sufficiently greater than the cross-section of said sheathed electrical conductors to permit the passage of gas therethrough into the passageway within the housing of said soldering iron.

5. Ultrasonic apparatus including a generator for furnishing alternating current to a magnetostrictive transducer, a gas-pressure control box containing means for regulating the pressure of gas discharged therefrom, electrical conductors from said generator extending through said control box and passing therefrom as a sheathed bundle within a flexible tubular gas-discharge conduit, and a soldering iron comprising a longitudinal and generally imperforate housing, a magnetostrictive transducer within said housing, a soldering tip coupled to one end of said magnetostrictive transducer by a coupling bar, a passageway intermediate the outer surface of said housing, an inlet to said housing spaced from the end of said transducer remote from said soldering tip, said inlet being in communication with said passageway, a discharge orifice in the wall of said housing proximate the portion of said soldering tip joined to said coupling bar, said flexible tubular gas-discharge conduit from said gas-pressure control box gas-tightly joined to said inlet, the sheathed electrical conductors extending from said conduit through said inlet into said housing to said magnetostrictive transducer.

6. Ultrasonic soldering apparatus including a soldering iron comprising a longitudinal and generally imperforate housing, means for generating vibratory energy within said housing, a soldering tip coupled to said means for generating vibratory energy, said means for generating vibratory energy being spaced from the inner wall surface of said housing, a discharge orifice in the wall of said housing intermediate the ends of said housing, an inlet to said housing spaced from the end of said means for generating vibratory energy remote from said soldering tip, a flexible tubular conduit joined to said inlet, sheathed electrical conductors extending through said conduit and inlet into said housing to said means for generating vibratory energy, said flexible conduit having an internal cross-section sufficiently greater than the cross-section of said sheathed electrical conductors to permit the passage of gas therethrough, and a passageway joining said inlet to said discharge orifice in the wall of said housing.

7. Ultrasonic soldering apparatus including a soldering iron comprising a longitudinal and generally imperforate housing, means for generating vibratory energy within said housing, a soldering tip coupled to said means for generating vibratory energy, said means for generating vibratory energy being spaced from the inner wall surface of said housing a sufficient distance to form a passageway between said means for generating vibratory energy and the inner wall surface of said housing, an inlet to said housing spaced from the end of said means for generating vibratory energy remote from said soldering tip, said inlet being in communication with said passageway, a discharge orifice in the wall of said housing in communication with said passageway and spaced from the end of said means for generating vibratory energy remote from said inlet, a flexible tubular conduit gas-tightly joined to said inlet, sheathed electrical conductors extending through said conduit and inlet into said housing to said means for generating vibratory energy, said flexible conduit having an internal cross-section sufficiently greater than the cross-section of said sheathed electrical conductors to permit the passage of gas therethrough into the passageway within the housing of said soldering iron.

8. Ultrasonic soldering apparatus including a soldering iron comprising a longitudinal and generally imperforate housing, means for generating vibratory energy within said housing, a soldering tip coupled to one end of said means for generating vibratory energy by a coupling bar, support means spaced from and adjacent said coupling bar, one end of said support means being detached, the other end of said support means being joined to said coupling bar, said support means including an outwardly directed flange intermediate its ends, said flange being joined to the inner wall surface of said housing, said means for generating vibratory energy being spaced from the inner wall surface of said housing, an inlet to said housing spaced from the end of said means for generating vibratory energy remote from said soldering tip, and sheathed electric conductors extending through said inlet into said housing to said means for generating vibratory energy.

References Cited in the file of this patent

UNITED STATES PATENTS

| | | |
|---|---|---|
| 2,184,980 | Smith | Dec. 26, 1939 |
| 2,397,400 | Barwich | Mar. 26, 1946 |

FOREIGN PATENTS

| | | |
|---|---|---|
| 908,893 | Germany | Apr. 12, 1954 |